United States Patent [19]
Kobale et al.

[11] 4,201,453
[45] May 6, 1980

[54] LIQUID CRYSTAL CELL HAVING AN INSULATING LAYER OF A SILICON OXIDE BASE

[75] Inventors: Manfred Kobale, Faistenhaar; Hans Pink, Starnberg; Helwig Schaefer, Munich, all of Fed. Rep. of Germany

[73] Assignee: Siemens Aktiengesellschaft, Berlin & Munich, Fed. Rep. of Germany

[21] Appl. No.: 907,004

[22] Filed: May 18, 1978

[30] Foreign Application Priority Data

May 20, 1977 [DE] Fed. Rep. of Germany ....... 2722871

[51] Int. Cl.² .............................................. G02F 1/13
[52] U.S. Cl. ..................................... 350/340; 350/320
[58] Field of Search ................. 350/339, 340, 320, 341

[56] References Cited

U.S. PATENT DOCUMENTS

| | | | |
|---|---|---|---|
| 3,700,306 | 10/1972 | Cartmell et al. | 350/341 |
| 3,932,026 | 1/1976 | Sprokel | 350/339 |
| 3,938,242 | 2/1976 | Sussman | 350/341 X |
| 4,139,273 | 2/1979 | Crossland et al. | 350/340 |
| 4,150,877 | 4/1979 | Kobale et al. | 350/341 |

FOREIGN PATENT DOCUMENTS

| | | |
|---|---|---|
| 2246250 | 3/1973 | Fed. Rep. of Germany. |
| 2313730 | 3/1974 | Fed. Rep. of Germany. |
| 2354736 | 5/1974 | Fed. Rep. of Germany. |
| 1428700 | 3/1976 | United Kingdom. |

OTHER PUBLICATIONS

Joodman, "Liquid Crystal Displays-Packaging and Surface Treatments," *RCA Review,* vol. 35, Sep. 1974, pp. 447–461.

Kahn, "Orientation of Liquid Crystals by Surface Coupling Agents," *App. Phys. Lett.,* vol. 22, Apr. 5, 1973, pp. 386–388.

*Primary Examiner*—Edward S. Bauer
*Attorney, Agent, or Firm*—Hill, Van Santen, Steadman, Chiara & Simpson

[57] ABSTRACT

A liquid crystal cell having a pair of spaced carrier plates with inner surfaces forming a cavity for receiving a layer of liquid crystal material, each of said inner surfaces being provided with a conductive coating and at least one of the carrier plates having its conductive coating covered with an insulated layer of silicon oxide base characterized by the insulating layer containing an additive selected from a group consisting of boron oxide, tin oxide, titanium oxide and mixtures thereof so that the insulating layer causes homeotropic orientation of the molecules of the liquid crystal layer.

16 Claims, 1 Drawing Figure

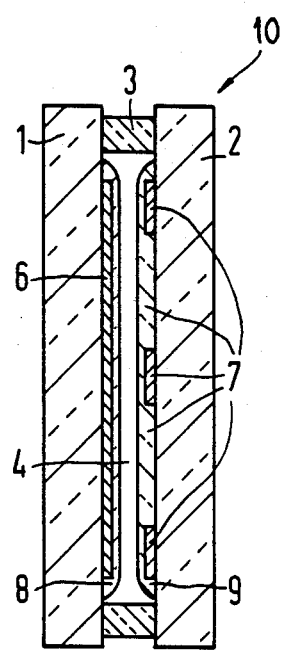

LIQUID CRYSTAL CELL HAVING AN INSULATING LAYER OF A SILICON OXIDE BASE

BACKGROUND OF THE INVENTION

1. Field of the Invention

The present invention is directed to a liquid crystal cell having a liquid crystal layer between two carrier plates which have conductive coatings on a surface and at least one of the coatings is covered by an insulating layer of a silicon oxide base.

2. Prior Art

Since liquid crystal layers will decompose under DC voltage and drive processes for liquid crystal cells, which do not use DC voltage components, are virtually impossible, the electrodes must be additionally coated with a layer of material which is insulating in respect to DC voltage. A coating of this kind must fulfill a series of requirements. It must possess a high electrical resistance and be as pore-free as possible. Furthermore, a coating must be able to adhere to various types of materials such as the materials of the substrate and electrodes, within a relatively wide temperature range. Also, the coating must be mechanically, thermally and chemically stable and, furthermore, the layer or coating must transmit as much light as possible. Finally, the cost of providing the coating must not be too high. It would also be ideal if the insulating layer could produce a requisite rest state texture in the material of the liquid crystal layer.

Successful experiments have previously been carried out with $SiO_2$ layers, and liquid crystal cells, which have conductive coatings covered by either a silicon oxide layer or silicon dioxide layer, are described in U.S. Pat. Nos. 3,700,306 and 3,932,026. Silicon dioxide is highly insulating, is highly suitable with regard to temperature changes and is extremely stable. However, without additional measures, the silicon dioxide orientates a liquid crystal, if at all, in a plate-parallel fashion which is known as a homogeneous orientation. If a plate perpendicular or homeotropic molecule alignment of the liquid crystal layer is required, as in the case of a dynamic scattering, the DAP effect or "phase change" effect, and if it were not desirable to dispense with the $SiO_2$ layers which, in other respects, are highly suitable, specific silanol groups would have to be produced on the $SiO_2$ layer surface and/or orientation means would have to be added to the material forming the liquid crystal layer. An article by Frederic J. Kahn, "Orientation Of Liquid Crystals By Surface Coupling Agents", Appl. Phys. Lett., Vol. 22, No. 8, Apr. 15, 1973, pages 386-388 discusses certain of such procedures for obtaining a desired orientation. A summary of the various orientation techniques is given in an article by L. A. Goodman, "Liquid-Crystal Displays—Packaging And Surface Treatments", RCA Review, Vol. 35, September 1974, pages 447-461. It is obvious that the processes mentioned above necessitate further production outlays and expenses and can only impair the quality of the liquid crystal. To this must also be added the fact that the double layer formed from $SiO_2$ and the silanes can only be non-reflective by careful matching of the relevant layer thicknesses.

SUMMARY OF THE INVENTION

The present invention is directed to providing a liquid crystal display device having an insulating layer, which has favorable properties comparable to the properties of silicon oxide layers but is homeotropically orientated and can be constructed without any disturbing reflection in a simple manner.

To accomplish these tasks, the present invention is directed to an improvement in a liquid crystal cell having a pair of spaced carrier plates with inner surfaces forming a cavity for receiving a layer of liquid crystal material, each of said inner surfaces being provided with conductive coatings, and at least one of the carrier plates having its conductive coating provided with an insulating layer of a silicon oxide base. The improvement comprises in providing an insulating layer of silicon oxide with an additive selected from a group consisting of boron oxide, tin oxide, titanium oxide, and mixtures thereof so that such insulation layer causes homeotropic orientation of the molecules of the liquid crystal layer.

The silicon oxide within such insulation-orientation layer will be silicon dioxide, but silicon oxides having compositions according to the formula of $SiO_x$ wherein $1.5 < x \leq 2$ may be utilized. The oxide additives will generally consist of $B_2O_3$, $SnO_2$ and $TiO_2$. However, in the case of tin and titanium, other valences can be utilized. If possible, the content of either the tin oxide or the boron oxide should not exceed 10 weight percent. With the higher tin oxide component, the layer looses its good insulating properties. With the higher boron oxide, components of boric acid will be precipitated.

It has been proved that the insulating layer of a $SiO_x$ base wherein $x > 1.5$, which would be expected to possess a homogeneous orientation is, in fact, homeotropically oriented with the addition of above additives in accordance with the principles of the invention. No satisfactory explanation for this phenomena has yet been found. The proposed layer has good properties similar to those of pure $SiO_2$ layer and can be well matched thermally and optically to the characteristics of relevant substrates by the selection of the nature and quality of the additive.

The insulating layer provided by the invention can be produced extremely economically. First a solution is produced containing elements of silicon and of an additive selected from the group of boron, tin and titanium, at a predetermined ratio of one to the other. This solution is then applied to the carrier plate, which is to be provided with the insulating layer and then transformed the layer of such solution into an insulating-orientating layer by thermal decomposition. The solution can be applied particularly easily by submerging the carrier plate or by spraying the surface on which the layer is to be formed. The fact that the substrate is uniformly coated on both sides, when submerged, has a favorable effect insomuch as the plate warps only slightly during the following thermal treatment. The coating produced from the solution in accordance with the principles of the invention is virtually free of pin holes, possesses a determinable thickness, and has a marked orientation capacity.

An organic starting solution for applying the insulating-orientation layer preferably is comprised of the following components. A solvent selected from a relatively low molecular weight alcohol such as ethanol, esters of relatively low molecular weight carboxylic acid such as acetic acid, and relatively low molecular alcohols such as ethanol, and mixtures of such alcohols and such esters. Pure compounds of silicon and of the additive may be formed by reacting the selected metallic elements with a relatively low molecular weight carboxylic acid (preferably a monocarboxylic acid) and dissolving such compounds (i.e. Si(CH$_3$COO)$_4$ and Sn(CH$_3$COO)$_4$) in select solvents, such as those set forth above. Further, the silicon and the additive may be in the form of halides whose anions are at least partially substituted by acid radicals of relatively low molecular weight carboxylic acids, with these substituted halides (i.e. SnCl(CH$_3$COO)$_3$ or SiCl(CH$_3$COO)$_3$) being dissolved in the solution. Yet further silicon and the additive may be in the form of halides whose anions are partially or entirely substituted by (a) acid radicals of relatively low molecular weight carboxylic acids and hydroxyl radicals i.e., SiClOH(CH$_3$COO)$_2$ or by (b) radicals of relatively low molecular weight (i.e. SiCl(C$_2$H$_5$O)$_3$) or BClOH(C$_2$H$_5$O). Again, these halides are dissolved in the solution. In the case of the relatively low molecular weight carboxylic acids and low molecular weight alcohols, the carbon chain in each molecule preferably contains a maximum of 4 carbon atoms.

British Pat. No. 1,428,700 produces homeotropic orientation layers by submerging a carrier plate into a solution consisting of an organic solvent and a metal compound dissolved therein and then subsequently subjecting the deposited solution to pyrolysis. However, the patent is concerned with either depositing pure SiO$_2$ or pure TiO$_2$ layers, which furthermore are arranged between the substrate and the conductive layers and do not provide any insulating function. Furthermore, the layers obtain their orientation effects by means of a special surface treatment, such as etching away of the overlying conductive layer.

BRIEF DESCRIPTION OF THE DRAWING

The FIGURE is a cross-sectional view of a liquid crystal cell in accordance with the present invention.

DESCRIPTION OF THE PREFERRED EMBODIMENT

The principles of the present invention are particularly useful in a crystal cell such as a digital display device generally indicated at 10 in the figure which is used as a dynamic scattering type display cell. The display 10 consists of two carrier plates 1 and 2, which are maintained at a predetermined spacing or distance from one another by a surrounding frame 3. A chamber 4 is formed by the inner surfaces of the carrier plates 1 and 2 and receives a layer of liquid crystal material. The two carrier plates are provided with conductive coatings on their inner surfaces with the carrier plate 1 being provided with a continuous coating 6 forming a rear electrode and the carrier plate 2 being provided with a segmented coating 7 that forms the segmented front electrodes. The rear electrode or coating 6 is coated with an insulating layer 8 while the segmented front electrodes 7 are coating with an insulating layer 9.

In an exemplary embodiment the two carrier plates 1 and 2 were comprised of soft glass and the frame 3 was comprised of a glass solder having a low melting point. The conductive coatings 6 and 7 were comprised of an antimony-doped tin oxide. The insulating layers 8 and 9 were comprised of an admixture of SiO$_2$ and 5 weight percent SnO$_2$. The layers 8 and 9 can have a thickness of between 500 Å to 5000 Å and had a preferred thickness in a range of between 1500 Å and 2000 Å.

The insulating layers such as 8 and 9 were produced in the following manner. The carrier plates 1 and 2 were provided with the finished electrode structures, such as continuous electrode layer 6 and the segment layer 7.

The plates 1 and 2 were then submerged in a solution comprising an ester of acetic acid and ethanol as the solvent and an organic compound of Si and Sn, such as Si(CH$_3$COO)$_4$ and Sn(CH$_3$COO)$_4$, dissolved therein. The plates 1 and 2 were withdrawn at a constant speed, which speed determines the thickness of the final layer. Thereafter, the substrate or carriers 1 and 2 were dried for 15 minutes at approximately 200° C. and then exposed to a temperature of 500° C. for 30 minutes. While the solution is being heat-treated, the two carrier plates can be additionally secured to one another by end vitrification of the glass solder frame 3. While pyrolytic decomposition of the solution may take place at a temperature as low as 100° C., relatively high temperatures should be used for tempering at least for a short length of time because with the increased temperatures, the layers 8 and 9 appear to become more solid and pore-free. Extremely good results are obtained with heat-treatment temperatures of between 400° C. and 500° C.

The invention is not limited to the illustrated exemplary embodiment. Within the scope of the proposed solution, the technician can determine which combination of additive materials and quantities thereof, are more suitable for particular conditions. The insulating layers can also be produced in a manner other than that of applying a solution with subsequent thermal decomposition. Also, it is not always necessary to cover the inner surface of both carrier plates with an insulating layer as the liquid crystal substance is also protected from a flow of DC current, when the electrodes of only one carrier plate are coated with an insulating layer. In this case, it would then be necessary to provide a suitable molecular orientation on the boundary surface which is free of the insulating layer by a different method.

Although various minor modifications may be suggested by those versed in the art, it should be understood that we wish to embody within the scope of the patent warranted hereon, all such modifications as reasonably and properly come within the scope of our contribution to the art.

We claim:

1. In a liquid crystal cell having a pair of spaced carrier plates with inner surfaces forming a cavity for receiving a layer of liquid crystal material, each of said inner surfaces being provided with conductive coatings, at least one of the carrier plates having its conductive coating provided with an insulating layer of a silicon oxide base with the improvement comprising wherein the insulating layer of silicon oxide contains an additive selected from a group consisting of boron oxide, tin oxide, titanium oxide and mixtures thereof so that the insulating layer causes homeotropic orientation of the molecules of the liquid crystal layer.

2. In a liquid crystal cell according to claim 1, wherein the silicon oxide has a chemical formula SiO$_x$ with $1.5 < x \leq 2$.

3. In a liquid crystal cell according to claim 2, wherein $x=2$.

4. In a liquid crystal cell according to claim 1, wherein the additive is boron oxide and is present in the insulating layer at a maximum of 10 weight percent of the insulating layer.

5. In a liquid crystal cell according to claim 1, wherein the additive is tin oxide and is present in the insulating layer at a maximum amount of 10 weight percent of the insulating layer.

6. A process for production of an insulating layer, which promotes homeotropic orientation of a liquid crystal cell comprising the steps of providing a solution containing silicon and an additive selected from a group consisting of boron, tin, titanium and mixtures thereof in a desired ratio to each other, applying the solution to the carrier plate of the liquid crystal cell, which plate is to be provided with the insulating layer, and finally, transforming the applied solution into the insulating layer by thermal decomposition to form the insulating layer composed of silicon oxide and oxides of the additive.

7. A process according to claim 6, wherein the step of applying the solution is accomplished by submerging the carrier plate into the solution.

8. A process according to claim 6, wherein the step of applying the solution comprises spraying the solution on a surface of the carrier plate.

9. A process according to claim 6, wherein the solution contains a solvent selected from a group consisting of relatively low molecular weight alcohols, esters of relatively low molecular weight carboxylic acids and relatively low molecular weight alcohols, and mixtures of said alcohols and said esters.

10. A process according to claim 9, wherein the molecules of the relatively low molecular weight carboxylic acids and relatively low molecular weight alcohols contain a carbon chain having a maximum of four carbon atoms.

11. A process according to claim 6, wherein the step of providing the solution of silicon and an additive includes reacting elements of silicon and the additive with a relatively low molecular weight monocarboxylic acid to produce compounds, and dissolving said compounds in said solution.

12. A process according to claim 11, wherein the molecules of the low molecular weight carboxylic acids contain a carbon chain comprising a maximum of four carbon atoms.

13. A process according to claim 6, wherein the step of providing the solution of silicon and an additive includes providing halides of the silicon and the additive, said halides having anions which are at least partially substituted by acid radicals of relatively low molecular weight carboxylic acids, and dissolving said halides in said solution.

14. A process according to claim 13, wherein the molecules of the low molecular weight carboxylic acids contain a carbon chain comprising a maximum of four carbon atoms.

15. A process according to claim 6, wherein the step of providing the solution of silicon and an additive, comprises providing halides of silicon and the additive, said halides having anions which are at least partially substituted by radicals selected from a group consisting of (a) relatively low molecular weight monocarboxylic acids and hydroxyl radicals and (b) relatively low molecular weight alcohols.

16. A process according to claim 15, wherein the molecules of the low molecular weight carboxylic acids, and low molecular weight alcohols contain a carbon chain comprising a maximum of four carbon atoms.

* * * * *